(12) United States Patent
Yu et al.

(10) Patent No.: US 11,582,718 B2
(45) Date of Patent: Feb. 14, 2023

(54) METHOD AND APPARATUS IN SIDELINK COMMUNICATION

(71) Applicant: Lenovo (Beijing) Limited, Beijing (CN)

(72) Inventors: Xiaodong Yu, Beijing (CN); Haipeng Lei, Beijing (CN); Zhi Yan, Beijing (CN); Lianhai Wu, Beijing (CN); Chenxi Zhu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 26 days.

(21) Appl. No.: 16/639,954

(22) PCT Filed: Aug. 18, 2017

(86) PCT No.: PCT/CN2017/098101
§ 371 (c)(1),
(2) Date: Feb. 18, 2020

(87) PCT Pub. No.: WO2019/033407
PCT Pub. Date: Feb. 21, 2019

(65) Prior Publication Data
US 2020/0252909 A1    Aug. 6, 2020

(51) Int. Cl.
*H04W 72/04*    (2009.01)
*H04W 72/02*    (2009.01)
(Continued)

(52) U.S. Cl.
CPC ....... *H04W 72/02* (2013.01); *H04W 28/0278* (2013.01); *H04W 72/0446* (2013.01); *H04W 80/08* (2013.01); *H04W 92/18* (2013.01)

(58) Field of Classification Search
CPC combination set(s) only.
See application file for complete search history.

(56) References Cited

U.S. PATENT DOCUMENTS

2018/0069664 A1*  3/2018  Khoryaev ............. H04L 1/1812
2018/0146494 A1*  5/2018  Khoryaev ............. H04W 76/23
(Continued)

FOREIGN PATENT DOCUMENTS

CN      106304351 A         1/2017
EP        3125643 A1 *      2/2017 ......... H04B 7/15542
(Continued)

OTHER PUBLICATIONS

Intel (Intel Corporation: "Sidelink Resource Allocation and Configuration for Wearable and IoT Use Cases", R1-170733, May 2017, IDS Feb. 18, 2020).*

(Continued)

*Primary Examiner* — Lakeram Jangbahadur
(74) *Attorney, Agent, or Firm* — Kunzler Bean & Adamson

(57) ABSTRACT

Apparatuses and methods are disclosed for sidelink (SL) communication. One method of apparatus includes determining a first resources pool for SL communication which includes SL transmission resources and SL reception resources, and transmitting resources information to a relay UE. Wherein, the first resources pool is a SL subframes pool or a SL SPS configurations pool, and the resources information is the first resource pool or a resource pair selected by the apparatus for SL communications.

27 Claims, 12 Drawing Sheets

(51) Int. Cl.
*H04W 28/02* (2009.01)
*H04W 72/0446* (2023.01)
*H04W 80/08* (2009.01)
*H04W 92/18* (2009.01)

(56) References Cited

U.S. PATENT DOCUMENTS

| 2018/0242393 | A1* | 8/2018 | Wei | H04W 88/04 |
| 2020/0084811 | A1* | 3/2020 | Uchiyama | H04L 5/0055 |
| 2020/0305165 | A1* | 9/2020 | Inokuchi | H04W 28/14 |
| 2021/0037549 | A1* | 2/2021 | Akkarakaran | H04W 72/1247 |
| 2021/0105066 | A1* | 4/2021 | Uchiyama | H04B 7/15542 |

FOREIGN PATENT DOCUMENTS

| WO | 2016182601 A1 | 11/2016 |
| WO | WO2016-705460 A1 * | 11/2016 |

OTHER PUBLICATIONS

Lenovo (Lenovo, Motorola Mobility, "Sidelink resource allocation and configuration", R1-1707772, May 2017, IDS Feb. 18, 2020).*
PCT/CN2017/098101, "International Search Report of the International Searching Authority", PCT International Searching Authority, dated Apr. 23, 2018, pp. 1-4.
PCT/CN2017/098101, "Written Opinion of the International Searching Authority", PCT International Searching Authority, dated May 22, 2018, pp. 1-3.
Intel, "Sidelink Resource Allocation and Configuration for Wearable and IoT Use Cases", R1-1707333, 3GPP TSG RAN WG1 Meeting #89, May 15-19, 2017, pp. 1-8.
Intel, "TP to capture RAN1#88bis and RAN1#89 Agreements in 3GPP TR 36.746", R1-1709676, 3GPP TSG RAN WG1 Meeting #89, May 15-19, 2017, pp. 1-6.
Intel / ITRI / Sony, "WF on Conflict Free UE-to-NW Relaying", R1-1709405, 3GPP TSG RAN WG1 Meeting #89, May 15-19, 2017, pp. 1-3.
Sony, "Discussion on sidelink resource allocation and configuration", R1-1708264, 3GPP TSG RAN WG1 meeting #89, May 15-19, 2017, pp. 1-6.
Lenovo-Motorola, "Sidelink resource allocation and configuration", R1-1707772, 3GPP TSG RAN WG1 Meeting #89, May 15-19, 2017, pp. 1-3.
LG ELECTRONICS, "Discussion on sidelink resouice allocation and pool configuration for IoT and wearables", R1-1707584, SGPP TSG RAN WG1 Meeting #89, May 15-19, 2017, pp. 1-3.
Catt, "Missing Packet due to Half-duplex in PC5", R2-156404, 3GPP TSG RAN WG2 Meeting #92, Nov. 15-20, 2015, pp. 1-3.
Catt, "Missing Packet due to Half-duplex in PC5", R2-154245, 3GPP TSG RAN WG2 Meeting #91bis, Oct. 5-9, 2015, pp. 1-2.

* cited by examiner

METHOD AND APPARATUS IN SIDELINK COMMUNICATION

FIELD

The subject matter disclosed herein relates generally to wireless communication and more particularly relates to collision avoidance in Device-To-Device (D2D) communication.

BACKGROUND

The following abbreviations and acronyms are herewith defined, at least some of which are referred to within the following description.

Third Generation Partnership Project ("3GPP"), Positive-Acknowledgment ("ACK"), Channel State Information ("CSI"), Control Channel ("CCH"), Device-to-Device ("D2D"), further enhancement Device-to-Device ("feD2D"), Downlink Control Information ("DCI"), Downlink ("DL"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Multiple Access ("MA"), Machine Type Communication ("MTC"), Narrowband ("NB"), Negative-Acknowledgment ("NACK") or ("NAK"), Orthogonal Frequency Division Multiplexing ("OFDM"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Quality of Service ("QoS"), Radio Network Temporary ("RNTI"), Identity Radio Resource Control ("RRC"), Receive ("RX"), Scheduling Assignment ("SA"), Scheduling Request ("SR"), Shared Channel ("SCH"), Sidelink Control Information ("SCI"), System Information Block ("SIB"), Sidelink ("SL"), Semi-Persistent Scheduling ("SPS"), Transport Block ("TB"), Transport Block Size ("TBS"), Transmission Control Protocol ("TCP"), Time Division Duplex ("TDD"), Time-Division Multiplexing ("TDM"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X"). As used herein, SL communication is also known as D2D communication.

In mobile communication networks, a remote UE may operate in an indirect communication mode where the remote UE accesses mobile network communication services via a relay UE. Both D2D and V2V communication are broadcast-based communication. However, broadcast-based communication does not meet requirements for QoS, reliability, complexity and power consumption; thereby a new study on feD2D has been developed, that proposes to support unicast communication on sidelink.

BRIEF SUMMARY

Enhancements to enable reliable unicast sidelink communication require effective resource allocation for D2D communication between a relay UE and a remote UE. But if either a remote UE or a relay UE communication is not controlled by eNB, there is a probability that SL reception and transmission, as well as UL transmission of the relay UE, may collide. Moreover, SL transmission from the remote UE may have a collision with its linked relay UE uplink transmission or sidelink transmission. It is thus necessary to consider enhancements to resource allocation in order to avoid these collisions.

Methods and apparatuses for collision avoidance in SL communication are disclosed. One method of network equipment for collision avoidance in SL communication includes the determining a first resources pool for SL communication which includes SL transmission resources and SL reception resources, selecting a resources pair for SL communication and then transmitting the resources pair to a relay UE as resources information.

One method for a relay UE to avoid collision in SL communication includes the relay UE receiving the resources pair as resources information for SL communication with remote UEs.

In another aspect, one method of a network equipment for collision avoidance in SL communication includes the network equipment determining a first resources pool for SL communication which includes SL transmission resources and SL reception resources a, transmitting the first resources pool to a relay UE as resources information, and then transmitting an indication to the relay UE, which includes a second resources pool, another resources pair which is different from the select resources pair by Relay UE, or a confirmation for the selected resources pair by the relay UE, in response to the selection of a resources pair from the first resources pool by the relay UE.

In another aspect, one method for a relay UE to avoid collision avoidance in SL communication includes the relay UE receiving a first resources pool for SL communication which includes SL transmission resources and SL reception resources, and then transmitting assistant information that includes a resources pair selected by UE from the first resources pool, and then receiving an indication from the network equipment which includes a second resources pool, another resources pair which is different with the select resources pair by Relay UE 1100, or a confirmation for the selected resources pair by the relay UE.

In another aspect, the resources for SL receptions in the resources pair are corresponding to the resources for SL transmission in the resources pair.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1A:
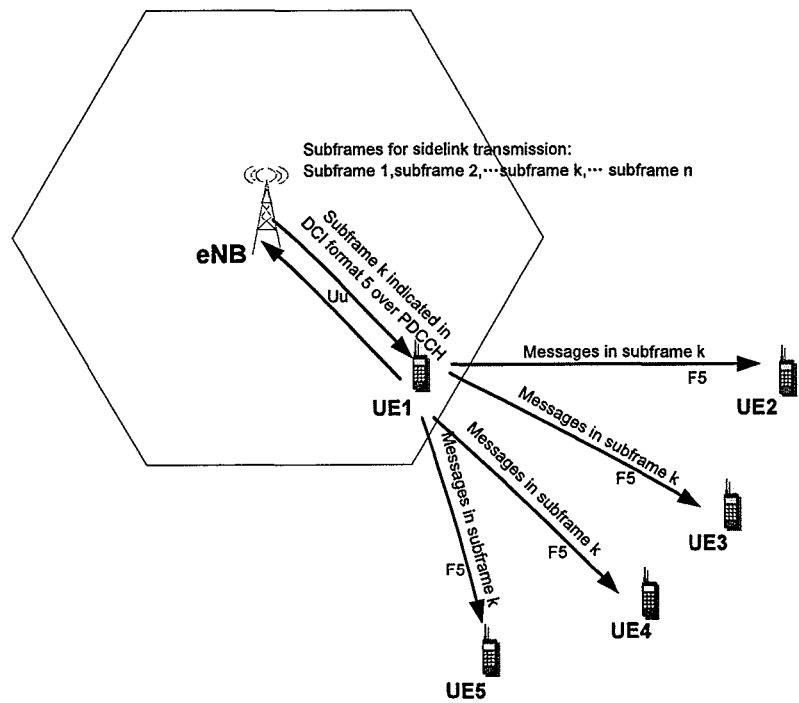
FIGS. 1A and 1B are schematic diagrams illustrating two examples of broadcast D2D communication between a relay UE and remote UEs.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements to the sidelink in feD2D should be studied to support unicast communication in order to meet the requirements for QoS, reliability, complexity and power consumption, and furthermore, to enable D2D aided wearables and MTC applications. Disclosed herein are methods, apparatus, and systems that provide a resources pair for SL transmission and reception in D2D communication. The resources pair is selected from a resources pool by network equipment such as eNB or a relay UE. As described herein, the resources pool is either a SL subframes pool or a SPS configuration pool available for D2D communication between a relay UE and remote UEs. If the resources pool is a SL subframes pool, the resources pair includes one or more subframes for SL transmission and one or more subframes for SL receptions. Similarly, if the resources pool is a SL SPS configuration pool, the resources pair includes one or more SPS configuration for SL transmission and one or more SPS configuration for SL receptions.

Additionally, if the resources pair is selected from a resources pool by a network equipment such as eNB, the resources pair is transmitted from eNB to a relay UE as resources information by a downlink control signaling such as a DCI format over PDCCH. If the resources pair is selected from a resources pool by a relay UE, the resources pool is transmitted from eNB to a relay UE as resources information by a higher layer signaling such as a RRC signaling.

Additionally, regarding a priority between UL communication and SL communication of a relay UE, the relay UE may select a resources pair intended to be used for SL transmission and reception from a received resources pool but eNB determines a resources pair actually used for SL transmission and reception in the case that UL communication of a relay UE has a higher priority than SL communication thereof. Alternatively, a relay UE may select and determine a resources pair for SL transmission and reception from a received resources pool where SL communication of a relay UE has a higher priority than UL communication thereof according to one embodiment.

Figure 1B:
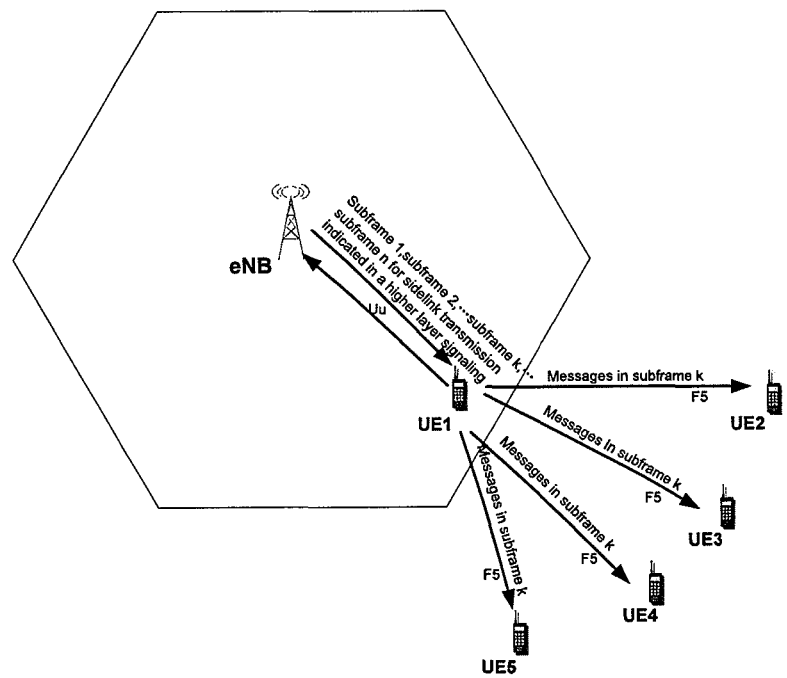

FIGS. 1A and 1B are schematic diagrams illustrating two examples of broadcast D2D communication between a relay UE and remote UEs. FIG. 1A illustrates that eNB indicates SL subframes for broadcast D2D communication to UE1 by in DCI format 5 over PDCCH, which is typically a case of sidelink transmission mode 1. FIG. 1B illustrates that eNB transmits a SL subframes pool to UE1 by a higher layer signaling such as RRC signaling and UE1 determines the SL subframes for broadcast D2D communication, which is typically a case of sidelink transmission mode 2. UE1 is a relay UE in the coverage of a serving eNB, while UE2, UE3, UE4 and UE5 are remote UEs out of the coverage of eNB. The interface between the relay UE and the eNB is known as a Uu interface, while the interface between the relay UE and remote UEs is known as a F5 interface presenting a sidelink (SL) between the relay UE and remote UEs. D2D communication is also referred as SL communication herein. As mentioned above, unicast communication over F5 interface is required in feD2D in order to meet the requirements for QoS, reliability, complexity and power consumption, thereby a resources pair for SL transmission and reception is provided according to an embodiment below.

In 3GPP specifications, it is required that SL communication adopts the same frequency carrier with UL communication for a relay UE in a FDD system. Alternatively, it is required that some UL subframes are reused as SL subframes for D2D communication in TDD systems, thereby DL communication and SL communication can be easily separated from the perspective of frequency domain or time domain. Correspondingly, the study focuses on a collision avoidance between UL subframes and SL subframes for a relay UE while both D2D and cellular communication coexist.

Figure 2A:
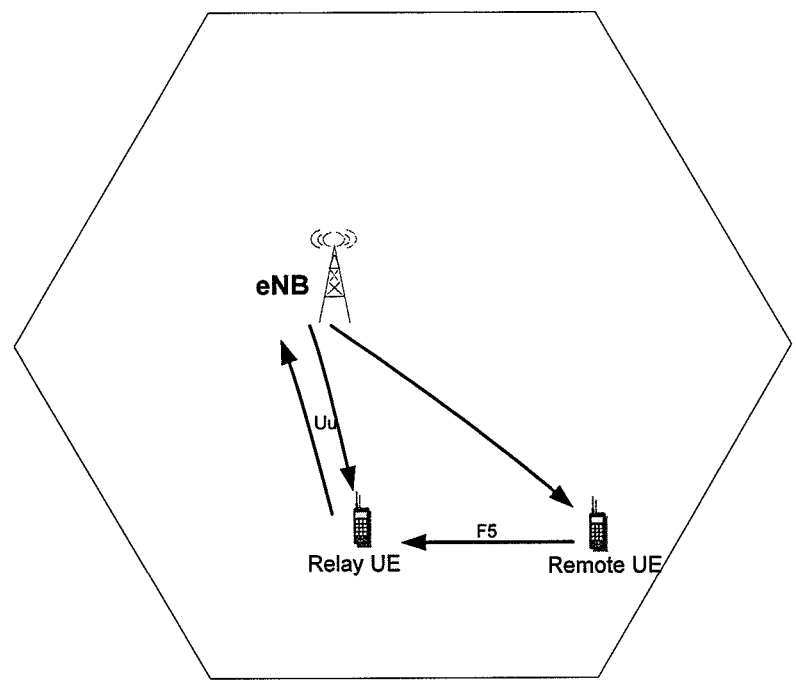
FIGS. 2A and 2B are schematic diagrams illustrating unidirectional relay case and bidirectional relay case in unicast D2D communication, respectively.

FIG. 2A is a schematic diagram illustrating a case of unidirectional relay in unicast D2D communication. Both a relay UE and a remote UE are within the coverage of eNB. eNB controls resources scheduling for both the relay UE and the remote UE such that collision between the SL subframes and UL subframes can be fully prevented by eNB. However, the downlink control from eNB to remote UE consumes processing capabilities of eNB, which can be leveraged by bidirectional relay as illustrated in FIG. 2B.

Figure 2B:
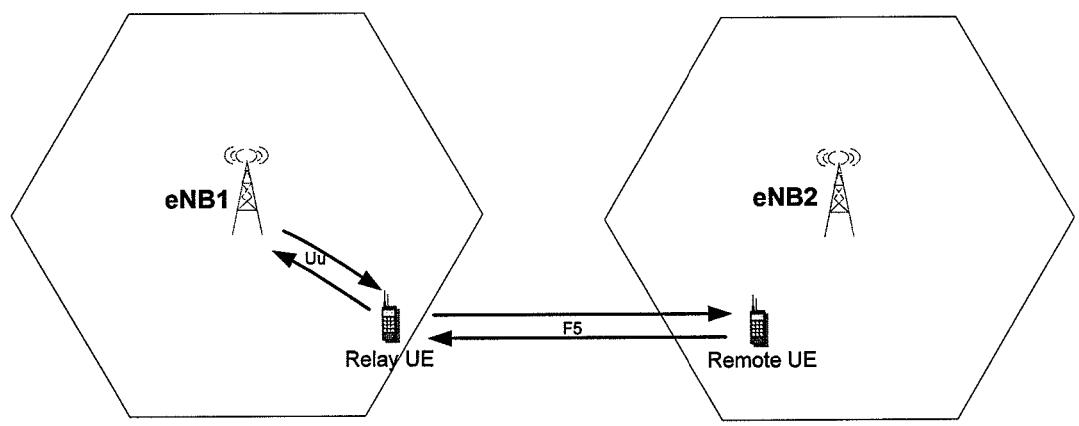

FIG. 2B is a schematic diagram illustrating a case of bidirectional relay in unicast D2D communication. Relay UE is required to be in the coverage of eNB in FIG. 2B. eNB only controls resources scheduling for the relay UE, while the relay UE controls both transmission and reception with the remote UE. Processing capability of eNB can be saved by the relay UE undertaking the bidirectional communication with remote UE in FIG. 2B. Further, the collision between SL communication and UL communication of the relay UE due to the bidirectional relay can be prevented according to the following embodiments.

As described herein, the resources for SL communication includes both SL subframes and SL SPS configurations for D2D communication. To support more allocations in cellular communication, without increasing the size of the PDCCH, semi-persistent scheduling (SPS) can be adopted. The UE is pre-configured by the eNB with an SPS-RNTI (allocation ID) and a periodicity in the case of SPS. Once pre-configured, the allocation would be repeated and the UE would receive an allocation (DL/UL) using the SPS-RNTI (instead of the typical C-RNTI) according to the pre-configured periodicity without UE periodically acquiring resources allocation over PDCCH.

During SPS, certain things remain fixed for each allocation: RB assignments, Modulation and Coding Scheme, etc. Because of this, if the radio link conditions change, a new allocation will have to be sent (over PDCCH). Also, any incremental redundancy (HARQ subsequent transmissions) will be separately scheduled using dynamic scheduling. Also, to avoid the wasting of resources when a data transfer is completed, there are several mechanisms for deactivating SPS (explicit, inactivity timer, etc.).

Figure 3:
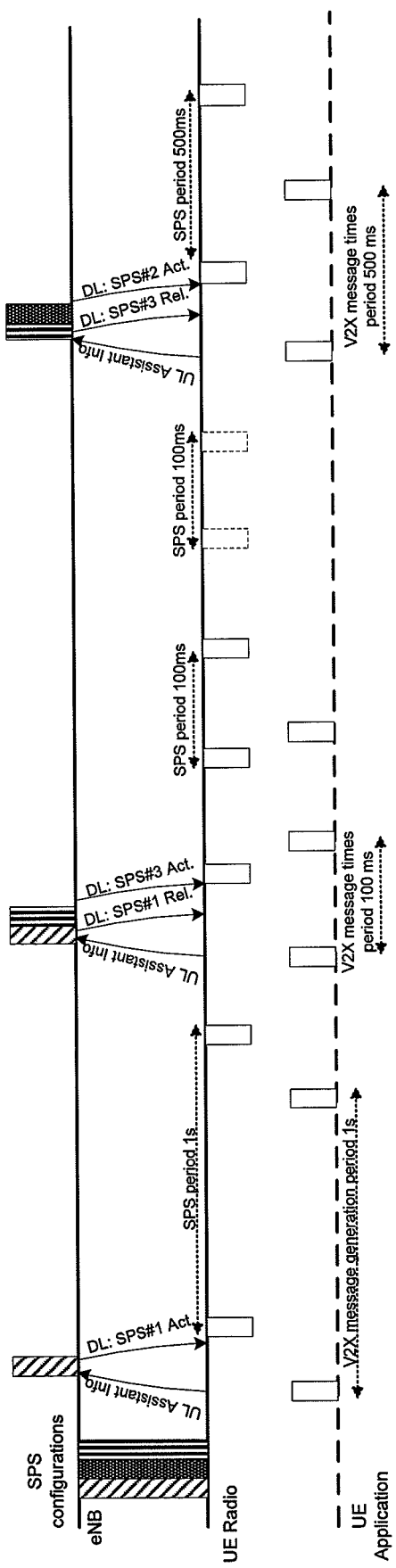
FIG. 3 is a schematic diagram illustrating three SPS configurations with different resources periods.

Additionally, an eNB can configure multiple SPS configurations each of which may have different parameters such as the resources period. The UE can report the assistance information to the eNB to indicate the expected message generation period, time offset, maximum message size, etc. The eNB can activate/release each SPS configuration based on the reported information. FIG. 3 is a schematic diagram illustrating three SPS configurations with different resources periods.

As shown in FIG. 3, the UE detects that a V2X message with a period of one second is intended to be transmitted, and then the UE transmits assistant information to the eNB indicating that the message with a period of one second is intended to be transmitted. Correspondingly, the eNB transmits activation for SPS configuration 1 with a period of one second over PDCCH in response to the assistant information from the UE. After the V2X message with a period of one second are transmitted to eNB, the UE detects that some V2X messages with a period of 100 milliseconds is intended to be transmitted, then the UE transmits assistant information to the eNB indicating that some messages with a period of 100 milliseconds are intended to be transmitted. Correspondingly, the eNB transmits release for SPS configuration 1 with a period of one second and activation for SPS configuration 3 with a period of 100 milliseconds over PDCCH in response to the assistant information from the UE. The UE keeps transmitting the messages with a period of 100 milliseconds without transmitting the assistant information to eNB; the overhead for resources allocation over PDCCH is thereby decreased. Similar with the procedure for the activation/release of SPS configurations, the UE detects that a V2X message with a period of 500 milliseconds is intended to be transmitted, and then the UE transmits assistant information to the eNB indicating that a message with a period of 500 milliseconds is intended to be transmitted. Correspondingly, the eNB transmits the release for SPS configuration 3 with a period of 100 milliseconds and activation for SPS configuration 2 with a period of 500 milliseconds over PDCCH in response to the assistant information from the UE. The same principle can apply to uplink SPS for Uu-based V2X and sidelink SPS for PC5-based V2X.

Figure 4:
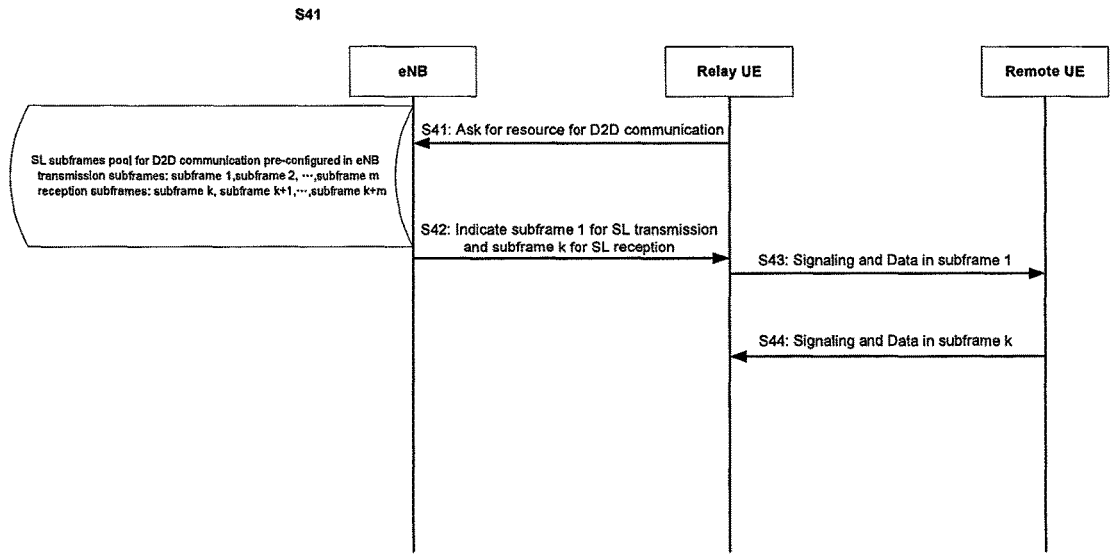
FIG. 4 is a call flow illustrating that eNB indicates a pair of SL subframes to a relay UE according to one embodiment.

FIG. 4 is a call flow illustrating that eNB indicates a pair of SL subframes to a relay UE according to one embodiment.

As shown in FIG. 4, a SL subframes pool is pre-configured in eNB, which includes subframe 1, subframe 2, . . . , subframe m for SL transmission and subframe k, subframe k+1, . . . , subframe k+m for SL receptions, for example.

In step S41, Relay UE asks for resources for D2D communication.

In step S42, eNB indicates a pair of subframes for D2D communication to Relay UE by a downlink control signaling, for example, subframe 1 for SL transmission and subframe k for SL reception, or one or more subframes for SL transmission and one or more subframes for SL reception. The subframes for SL receptions in the pair of subframes are corresponding to the subframes for SL transmission in the pair of subframes. For example, an offset between the subframes for SL receptions and the subframes for SL transmission is a fixed value which is pre-configured to Relay UE by eNB in a higher layer signaling, and eNB transmits only subframes for SL transmission to Relay UE in step S42 as Relay UE can obtain subframes for SL reception by adding the pre-configured offset to subframes for SL transmission. Alternatively, eNB indicates the subframes for SL transmission and an offset value between subframes for SL transmission and the corresponding subframes for SL reception to Relay UE in a downlink control signaling.

Additionally, once eNB determines the pair of subframes for D2D communication, eNB shall not schedule a UL transmission for Relay UE on one of more of the SL transmission subframes, the SL reception subframes and the pair of subframes for D2D communication to avoid the collision between UL communication and SL communication of Relay UE. Correspondingly, Relay UE does not expect UL transmission on one of more of the SL transmission subframes, the SL reception subframes and the pair of subframes for D2D communications, and furthermore, if there is a UL scheduling on the reception subframes in the pair of subframes for D2D communication, Relay UE should prioritize SL reception over UL transmission, especially for Relay UE without capability of simultaneous SL transmission/reception and UL transmission. Apparently, the priority described above also applies to SL SPS configurations instead of SL subframes.

Additionally, eNB selects a pair of subframes based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size, which may be reported by Relay UE.

In steps S43 and S44, Relay UE transmits signaling and data to Remote UE in subframes for SL transmission indicated by eNB and receives signaling and data from Remote UE in the corresponding subframes for SL reception, respectively. For example, the signaling from Relay UE to Remote UE includes scheduling information for SL communication and so on, and the signaling from Remote UE to Relay UE includes ACK/NACK feedback, channel information feedback and so on.

Figure 5:
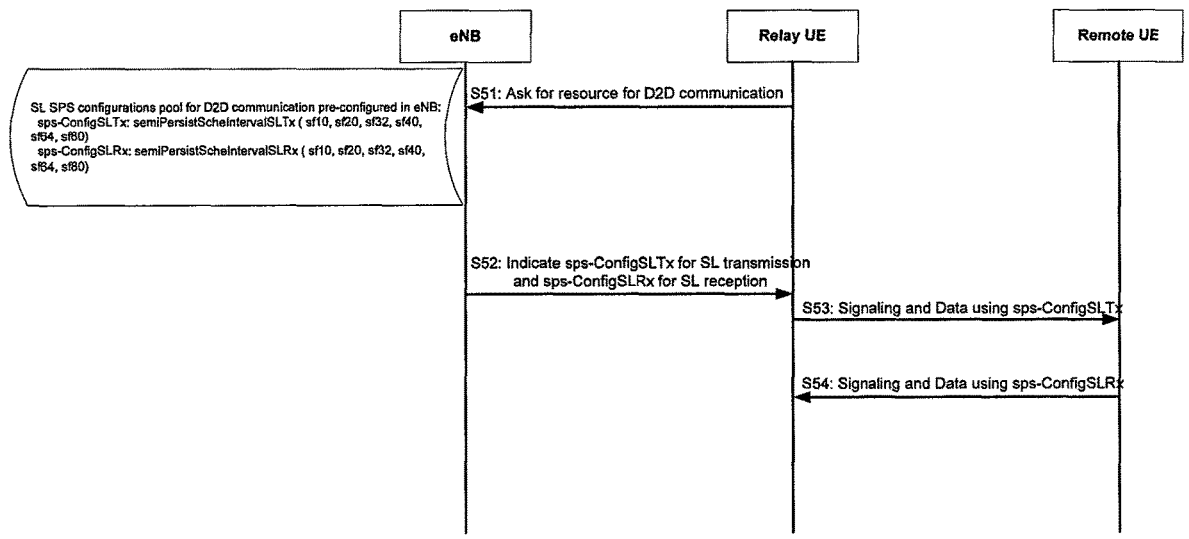
FIG. 5 is a call flow illustrating that eNB indicates a pair of SL SPS configurations to a relay UE according to one embodiment.

FIG. 5 is a call flow illustrating that eNB indicates a pair of SL SPS configurations to a relay UE according to one embodiment. The call flow in FIG. 5 is similar to that in FIG. 4, except that the resources pool and the resources pair are a SL SPS configuration pool and a pair of SL SPS configurations respectively.

Similar to the description in step S42 of FIG. 4, in step S52 of FIG. 5, eNB indicates a pair of SPS configurations (sps-ConfigSLTx and sps-ConfigSLRx) for D2D communication to Relay UE by a downlink control signaling, for example, one or more SPS configurations for SL transmission and one or more SPS configurations for SL reception. The SPS configurations for SL receptions in the pair of SPS configurations are corresponding to the SPS configurations for SL transmission in the pair of SPS configurations. For example, an offset between the SPS configurations for SL receptions (sps-ConfigSLRx) and the SPS configurations for SL transmission (sps-ConfigSLTx) is a fixed value which is pre-configured to Relay UE by eNB in a higher layer signaling, and eNB transmits only SPS configurations for SL transmission to Relay UE in step S52 as Relay UE can obtains SPS configurations for SL reception by adding the pre-configured offset to SPS configurations for SL transmission. Alternatively, eNB indicates the SPS configurations for SL transmission and an offset value between SPS configurations for SL transmission and the corresponding SPS configurations for SL reception to Relay UE in a downlink control signaling.

Additionally, besides eNB indicating a pair of SL SPS configuration for D2D communication to Relay UE by a downlink control signaling in step S52—also known as an activation of a SL SPS configuration pair—eNB may also transmit a downlink control signaling to release the SL SPS configuration once eNB detects that the SL communication with the allocated SL SPS configuration is completed, or update the SL SPS configuration if the channel state, traffic payload size or traffic type between the relay unit and remote units is changed, for example.

Figure 6A:
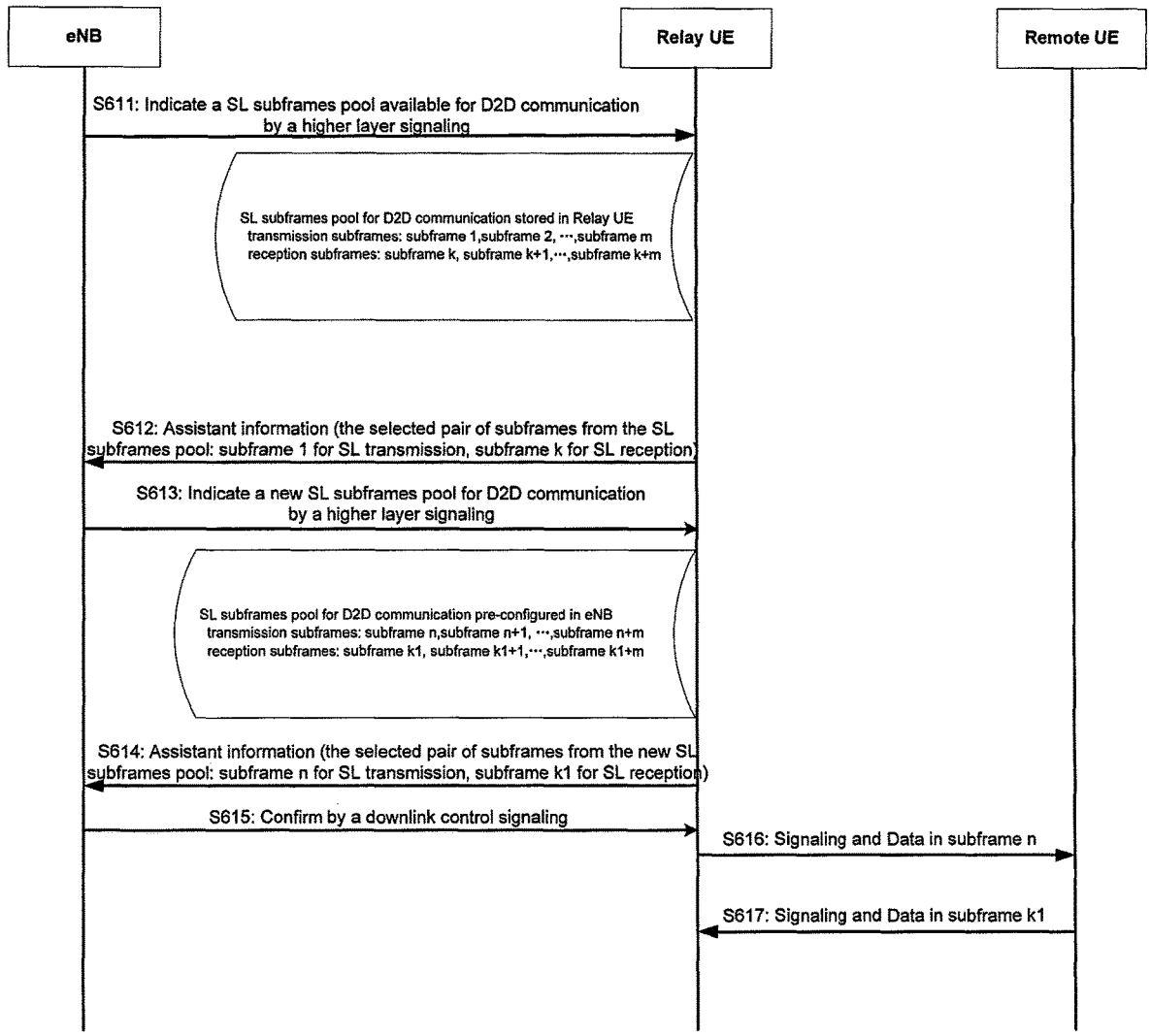
FIGS. 6A and 6B are call flows illustrating two examples that a relay UE selects a resources pair intended to be used in SL communication from a received resources pool and eNB determines a new resources pool available for SL communication in the case that UL communication of a relay UE has a higher priority than SL communication thereof according to one embodiment.
Figure 6B:
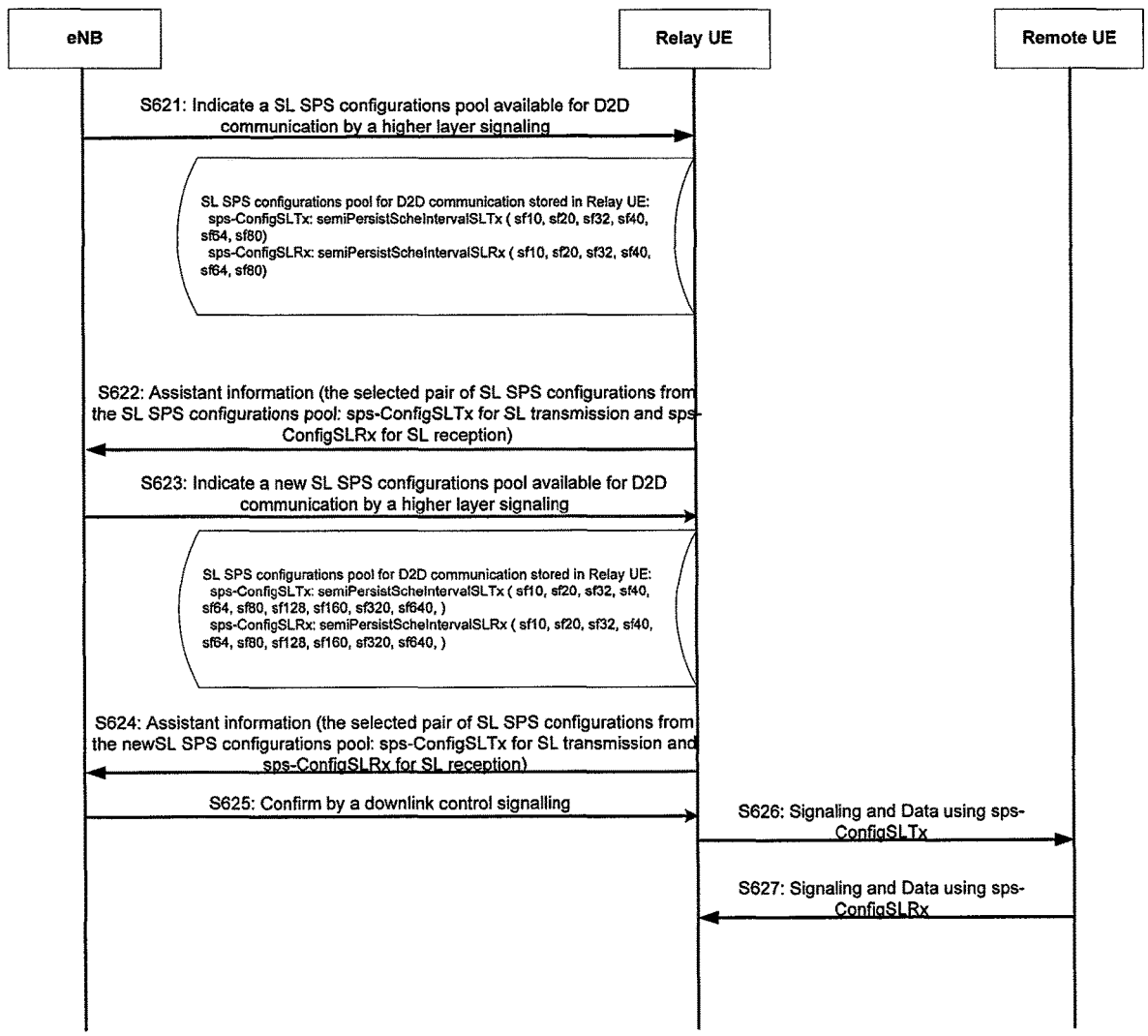

FIGS. 6A and 6B are call flows illustrating two examples that a relay UE selects a resources pair intended to be used in SL communication from a received resources pool and eNB determines a new resources pool available for SL communication in the case that UL communication of a relay UE has a higher priority than SL communication thereof according to one embodiment. In FIG. 6A, the resources pool and resources pair is a SL subframes pool and a pair of SL subframes respectively, while in FIG. 6B, the resources pool and resources pair is a SL SPS configurations pool and a pair of SL SPS configurations respectively.

As shown in FIG. 6A, in step S611, eNB indicates a SL subframes pool available for D2D communication by a higher layer signaling. Relay UE stores the received SL subframes pool.

Relay UE selects a pair of subframes for SL transmission and subframes for SL reception. According to an embodiment, Relay UE selects a pair of subframes based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size. The selected pair of subframes may include one or more subframes for SL transmission and one or more subframes for SL reception.

In step S612, Relay UE transmits assistant information, which includes the selected pair of subframes, to eNB. The subframes for SL receptions in the pair of subframes are corresponding to the subframes for SL transmission in the pair of subframes. For example, an offset between the subframes for SL receptions and the subframes for SL transmission is a fixed value which is pre-configured to Relay UE by eNB in a higher layer signaling, and Relay UE transmits only subframes for SL transmission to eNB in step S612 as eNB can obtain subframes for SL reception by adding the pre-configured offset to subframes for SL transmission. Alternatively, Relay UE indicates the subframes for SL transmission and an offset value between subframes for SL transmission and the corresponding subframes for SL reception to eNB.

eNB may update the SL subframes pools in the response to the indication from Relay UE including the selected pair of subframes. In step S613, eNB indicates a new SL subframes pool for D2D communication by a higher layer signaling. Correspondingly, Relay UE updates the stored SL subframes pool with the new SL subframes received from eNB.

Relay UE selects a pair of subframes for transmission and subframes for reception from the new received SL subframes pool. According to an embodiment, Relay UE selects a pair of subframes based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size. In step S614, Relay UE transmits new assistant information, which includes the selected pair of subframes from the new SL subframes pool, to eNB. Similarly, the subframes for SL receptions in the new pair of subframes are corresponding to the subframes for SL transmission in the new pair of subframes. For example, an offset between the subframes for SL receptions and the subframes for SL transmission is a fixed value.

In step S615, eNB confirms the selected pair of subframes from the new SL subframes pool by a downlink control signaling.

Additionally, once eNB confirms the pair of subframes for D2D communication, eNB shall not schedule a UL transmission for Relay UE on one of more of the SL transmission subframes, the SL reception subframes and the pair of subframes for D2D communication to avoid the collision between UL communication and SL communication of Relay UE. Correspondingly, Relay UE does not expect UL transmission on one of more of the SL transmission subframes, the SL reception subframes and the pair of subframes for D2D communications, and furthermore, if there is a UL scheduling on the reception subframes in the pair of subframes for D2D communication, Relay UE should prioritize SL reception over UL transmission, especially for Relay UE without capability of simultaneous SL transmission/reception and UL transmission. Apparently, the priority described above also applies to SL SPS configurations instead of SL subframes.

In step S616 and S617, Relay UE transmits signaling and data to Remote UE in subframes for SL transmission confirmed by eNB and receives signaling and data from Remote UE in the corresponding subframes for SL reception, respectively. For example, the signaling from Relay UE to Remote UE includes scheduling information for SL communication and so on, and the signaling from Remote UE to Relay UE includes ACK/NACK feedback, channel information feedback and so on.

According to the embodiment described in FIG. 6A, Relay UE needs to wait for the confirmation for the pair of SL subframes selected by Relay UE for SL communication from eNB. That is, UL communication of Relay UE has a higher priority than SL communication thereof. A priority flag which indicates the priority between UL communication and SL communication can be pre-configured to Relay UE by eNB in a higher layer signaling. If the priority flag indicates UL communication of a relay UE has a higher priority than SL communication thereof, Relay UE waits for the confirmation or follows the indication from eNB which indicates the resources pair actually used for D2D communication including a pair of SL subframes or a pair of SL SPS configurations.

The description for the call flow in FIG. 6B is omitted, since it is similar with that in FIG. 6A, except that the resources pool and the resources pair are a SL SPS configuration pool and a pair of SL SPS configurations respectively.

Figure 7A:
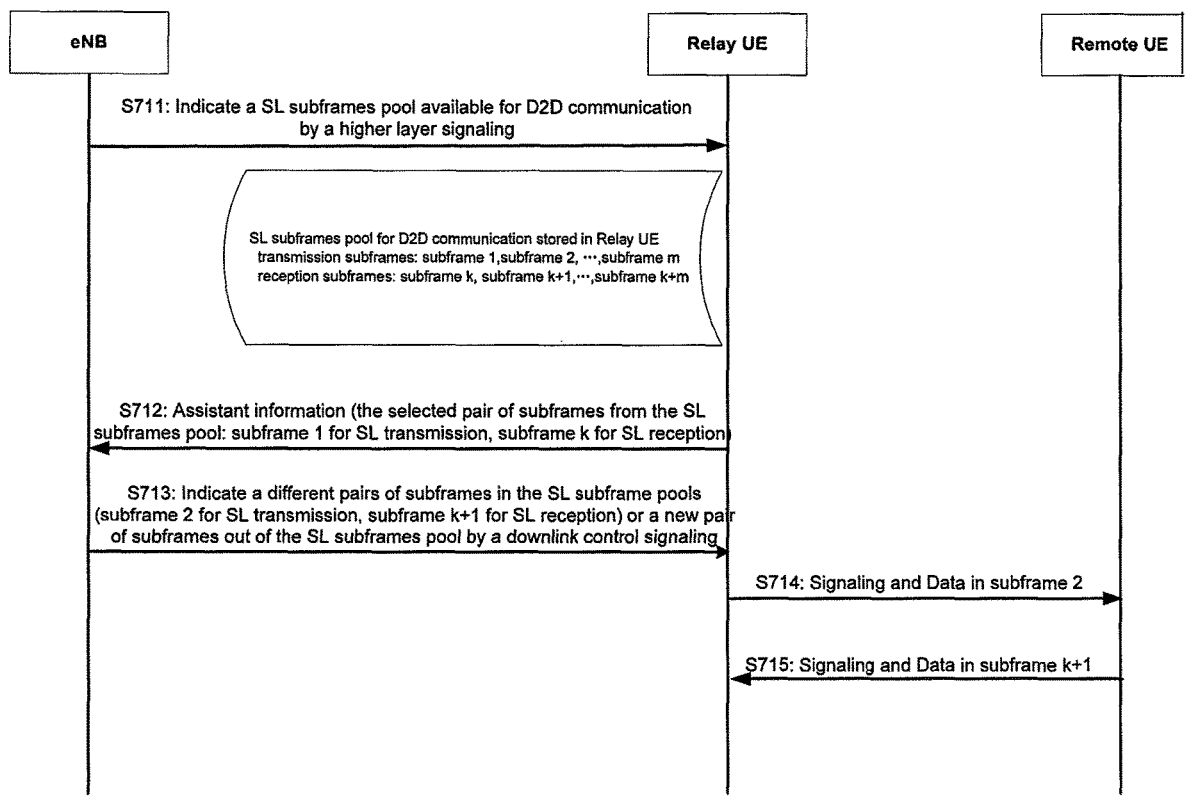
FIGS. 7A and 7B are call flows illustrating two examples where a relay UE selects a resources pair intended to be used in SL communication from a received resources pool and where eNB determines a new resources pair actually used for SL communication in the case that UL communication of a relay UE has a higher priority than SL communication thereof according to one embodiment.
Figure 7B:
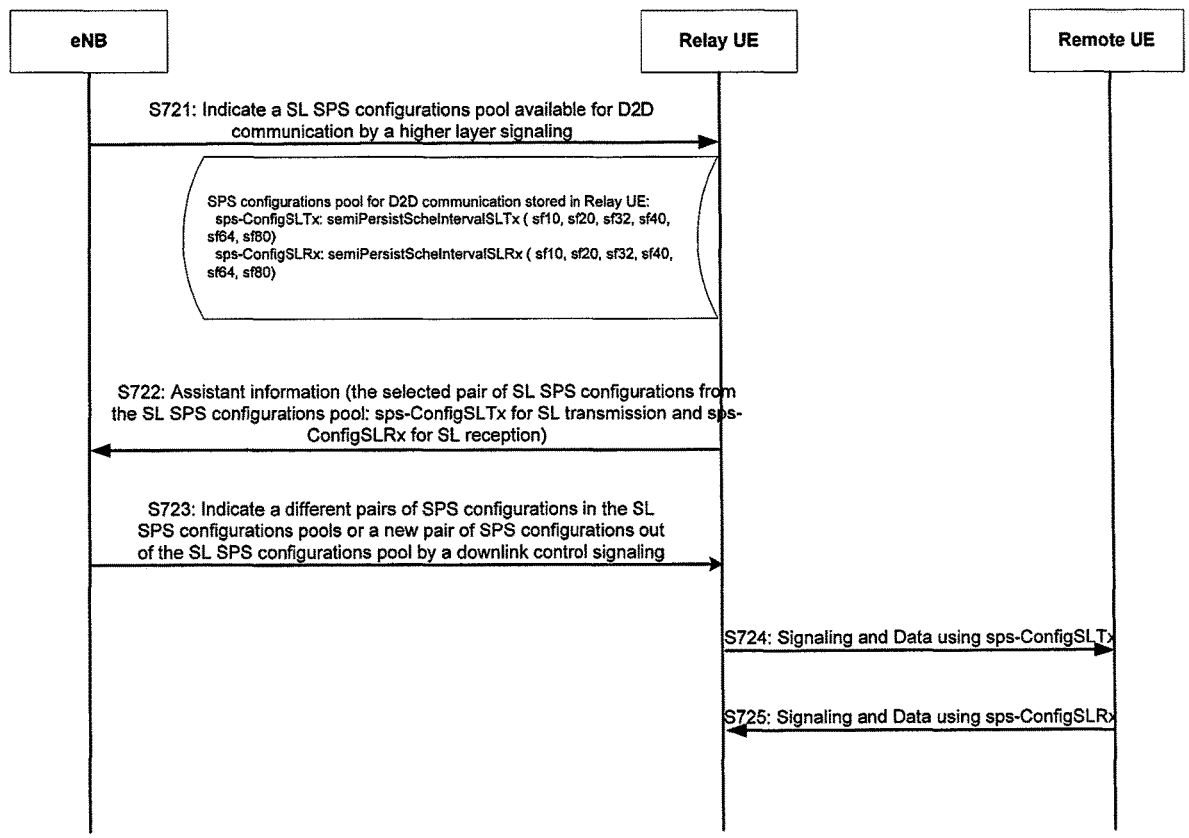

FIGS. 7A and 7B are call flows illustrating two examples that a relay UE selects a resources pair intended to be used in SL communication from a received resources pool and eNB determines a new resources pair actually used for SL communication where UL communication of a relay UE has a higher priority than SL communication thereof according to one embodiment. In FIG. 7A, the resources pool and resources pair is a SL subframes pool and a pair of SL subframes respectively, while in FIG. 7B, the resources pool and the resources pair are a SL SPS configurations pool and a pair of SL SPS configurations respectively.

As shown in FIG. 7A, in step 711, eNB indicates a SL subframes pool available for D2D communication by a higher layer signaling. Relay UE stores the received SL subframes pool.

Relay UE selects a pair of subframes for SL transmission and subframes for SL reception. According to an embodiment, Relay UE selects a pair of subframes based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size. The selected pair of subframes may include one or more subframes for SL transmission and one or more subframes for SL reception.

In step S712, Relay UE transmits assistant information, which includes the selected pair of subframes, to eNB. The subframes for SL receptions in the pair of subframes are corresponding to the subframes for SL transmission in the pair of subframes. For example, an offset between the subframes for SL receptions and the subframes for SL transmission is a fixed value which is pre-configured to Relay UE by eNB in a higher layer signaling, and Relay UE transmits only subframes for SL transmission to eNB in step S712 as eNB can obtain subframes for SL reception by adding the pre-configured offset to subframes for SL transmission. Alternatively, Relay UE indicates the subframes for SL transmission and an offset value between subframes for SL transmission and the corresponding subframes for SL reception to eNB.

In step S713, eNB does not accept the pair of subframes selected by Relay UE, and instead, indicates another pair of subframes in the SL subframes pool or a new pair of subframes out of the SL subframes pool to Relay UE by a downlink control signaling. The subframes for SL receptions indicated by eNB are corresponding to the subframes for SL transmission indicated by eNB. For example, an offset between the subframes for SL receptions and the subframes for SL transmission is a fixed value which is pre-configured to Relay UE by eNB in a higher layer signaling, and eNB transmits only subframes for SL transmission to Relay in step S713 as Relay UE can obtain subframes for SL reception by adding the pre-configured offset to subframes for SL transmission. Alternatively, eNB indicates the subframes for SL transmission and an offset value between subframes for SL transmission and the corresponding subframes for SL reception to Relay UE.

Additionally, once eNB determines the pair of subframes for D2D communication, eNB shall not schedule a UL transmission for Relay UE on one of more of the SL transmission subframes, the SL reception subframes and the pair of subframes for D2D communication to avoid collision between UL communication and SL communication of Relay UE. Correspondingly, Relay UE does not expect UL transmission on one of more of the SL transmission subframes, the SL reception subframes and the pair of subframes for D2D communications, and furthermore, if there is a UL scheduling on the reception subframes in the pair of subframes for D2D communication, Relay UE should prioritize SL reception over UL transmission, especially for Relay UE without capability of simultaneous SL transmission/reception and UL transmission. Apparently, the priority described above also applies to SL SPS configurations instead of SL subframes.

Additionally, eNB selects a pair of subframes for SL communication based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size, which may be reported by Relay UE.

In steps S714 and S715, Relay UE transmits signaling and data to Remote UE in subframes for SL transmission indicated by eNB and receives signaling and data from Remote UE in the corresponding subframes for SL reception, respectively. For example, the signaling from Relay UE to Remote UE includes scheduling information for SL communication and so on, and the signaling from Remote UE to Relay UE includes ACK/NACK feedback, channel information feedback and so on.

According to the embodiment described in FIG. 7A, Relay UE needs to wait for the confirmation for the pair of SL subframes selected by Relay UE for SL communication from eNB, or the indication of a new pair of SL subframes selected by eNB. That is, UL communication of Relay UE has a higher priority than SL communication thereof. A priority flag which indicates the priority between UL communication and SL communication can be pre-configured to Relay UE by eNB in a higher layer signaling. If the priority flag indicates that UL communication of a relay UE has a higher priority than SL communication thereof, Relay UE waits for the confirmation or follows the indication from eNB which indicates the resources pair actually used for D2D communication including a pair of SL subframes or a pair of SL SPS configurations.

The description for the call flow in FIG. 7B is omitted, since it is similar with that in FIG. 7A, except that the resources pool and the resources pair are a SL SPS configuration pool and a pair of SL SPS configurations respectively.

Figure 8A:
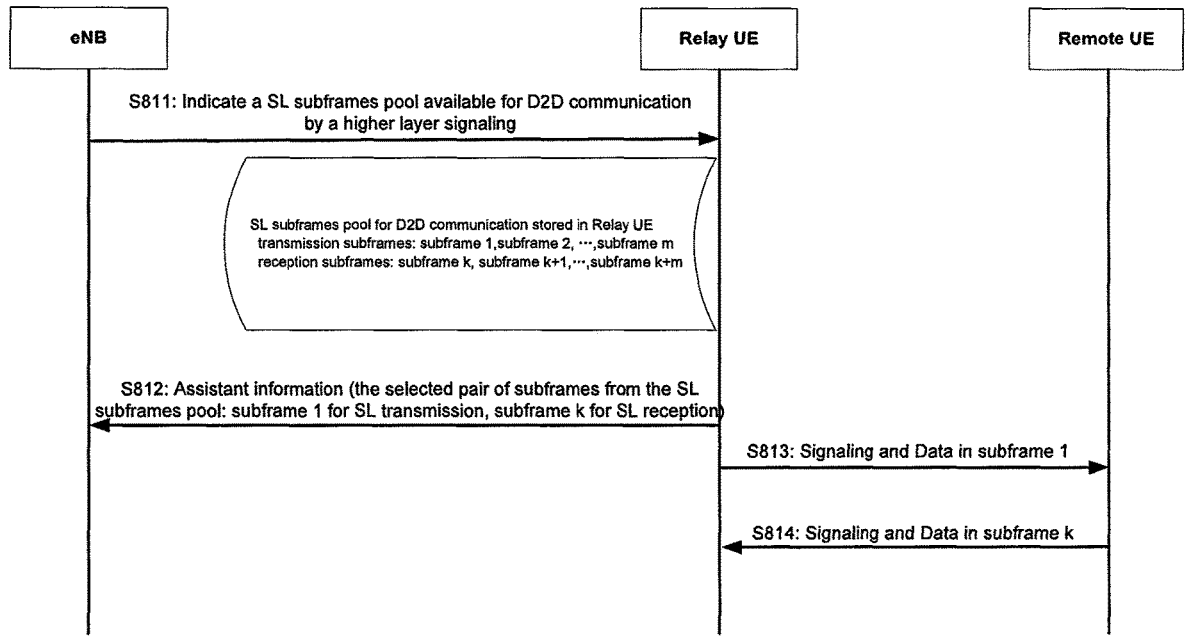
FIGS. 8A and 8B are call flows illustrating two examples where a relay UE selects and determines a resources pair for SL communication from a received resources pool in the case that SL communication of a relay UE has a higher priority than UL communication thereof according to one embodiment.
Figure 8B:
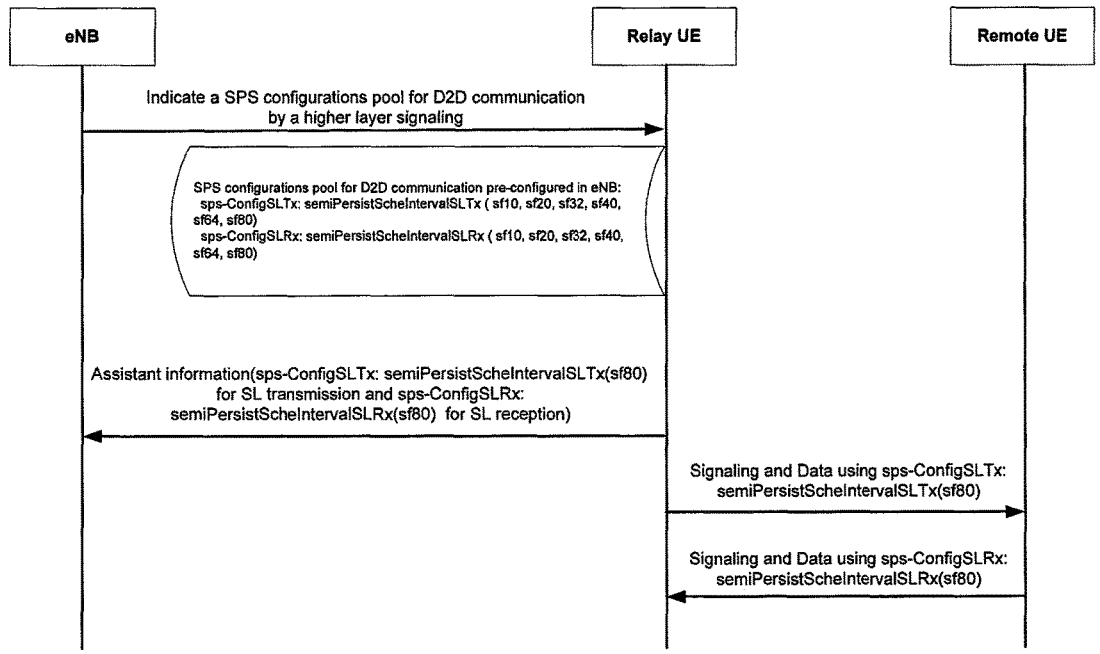

FIGS. 8A and 8B are call flows illustrating two examples where a relay UE selects and determines a resources pair for SL communication from a received resources pool in the case that SL communication of a relay UE has a higher priority than UL communication thereof according to one embodiment. In FIG. 8A, the resources pool and resources pair are a SL subframes pool and a pair of SL subframes respectively, while in FIG. 8B, the resources pool and resources pair are a SL SPS configurations pool and a pair of SL SPS configurations respectively.

As shown in FIG. 8A, in step 811, eNB indicates a SL subframes pool available for D2D communication by a higher layer signaling. Relay UE stores the received SL subframes pool.

Relay UE selects a pair of subframes for SL transmission and subframes for SL reception. According to an embodiment, Relay UE selects a pair of subframes based on one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size.

In step S812, Relay UE transmits assistant information, which includes the selected pair of subframes, to eNB. The subframes for SL receptions in the pair of subframes are corresponding to the subframes for SL transmission in the pair of subframes. For example, an offset between the subframes for SL receptions and the subframes for SL transmission is a fixed value which is pre-configured to Relay UE by eNB in a higher layer signaling, and Relay UE transmits only subframes for SL transmission to eNB in step S812 as eNB can obtains subframes for SL reception by adding the pre-configured offset to subframes for SL transmission. Alternatively, Relay UE indicates the subframes for SL transmission and an offset value between subframes for SL transmission and the corresponding subframes for SL reception to eNB.

Additionally, once eNB accepts the pair of subframes for D2D communication, eNB shall not schedule a UL transmission for Relay UE on one of more of the SL transmission subframes, the SL reception subframes and the pair of subframes for D2D communication to avoid the collision between UL communication and SL communication of Relay UE. Correspondingly, Relay UE does not expect UL transmission on one of more of the SL transmission subframes, the SL reception subframes and the pair of subframes for D2D communications, and furthermore, if there is a UL scheduling on the reception subframes in the pair of subframes for D2D communication, Relay UE should prioritize SL reception over UL transmission, especially for Relay UE without capability of simultaneous SL transmission/reception and UL transmission. Apparently, the priority described above also applies to SL SPS configurations instead of SL subframes.

According to the embodiment described in FIG. 8A, Relay UE does not need to wait for an accepting for the selection of the pair of SL subframes for SL communication from the resources pool by Relay UE from eNB. Even if Relay UE receives an indication of another pair of SL subframes selected by eNB, Relay UE ignores the indication. Alternatively, Relay UE receives an accepting for the selection of the pair of SL subframes for SL communication from the resources pool by Relay UE from eNB. That is, SL communication of Relay UE has a higher priority than UL communication thereof. A priority flag which indicates the priority between UL communication and SL communication can be pre-configured to Relay UE by eNB in a higher layer signaling. If the priority flag indicates SL communication of a relay UE has a higher priority than UL communication thereof, Relay UE does not wait for the confirmation or the indication from eNB which indicates the resources pair actually used for D2D communication including a pair of SL subframes or a pair of SL SPS configurations, and Relay UE performs D2D communication in the pair of subframes selected by itself in steps S813 and S814. For example, the signaling from Relay UE to Remote UE includes scheduling information for SL communication and so on, and the signaling from Remote UE to Relay UE includes ACK/NACK feedback, channel information feedback and so on.

The description for the call flow in FIG. 8B is omitted, since it is similar with that in FIG. 8A, except that the resources pool and the resources pair are a SL SPS configuration pool and a pair of SL SPS configurations respectively.

Figure 9:
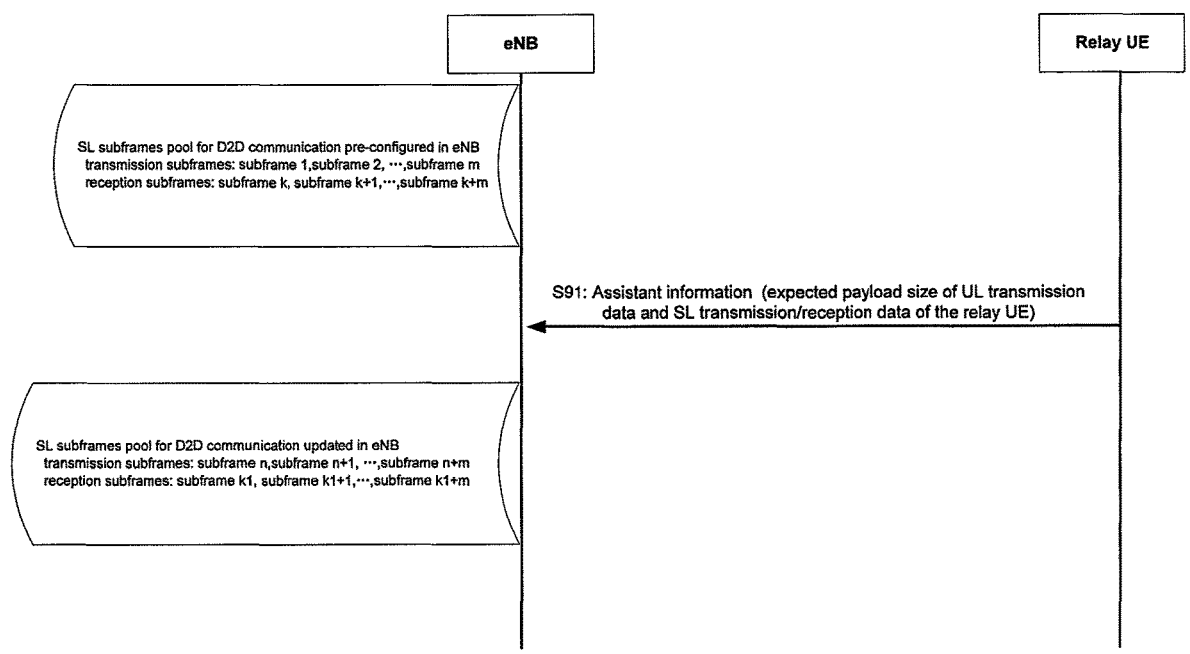
FIG. 9 is a call flow illustrating that a resources pool is updated according to assistant information from a relay UE according to one embodiment.

FIG. 9 is a call flow illustrating that a resources pool is updated according to assistant information from a relay UE according to one embodiment.

As shown in FIG. 9, the resources pool is stored in eNB and is not transmitted from eNB to Relay UE as resources information. That is, the resources pair for SL communication is selected by eNB. In step S91, Relay UE transmits assistant information including one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size. eNB adjusts the resources pool for SL communication according to the assistant information. For example, if the expected payload size of UL transmission data and SL transmission/reception data of Relay UE is increased, eNB also increases the resources pool for SL communication. SL subframes pool is used as an example of a resources pool in FIG. 9, but it should be understood that a SL SPS configuration pool can also be used as an example of a resources pool.

Figure 10:
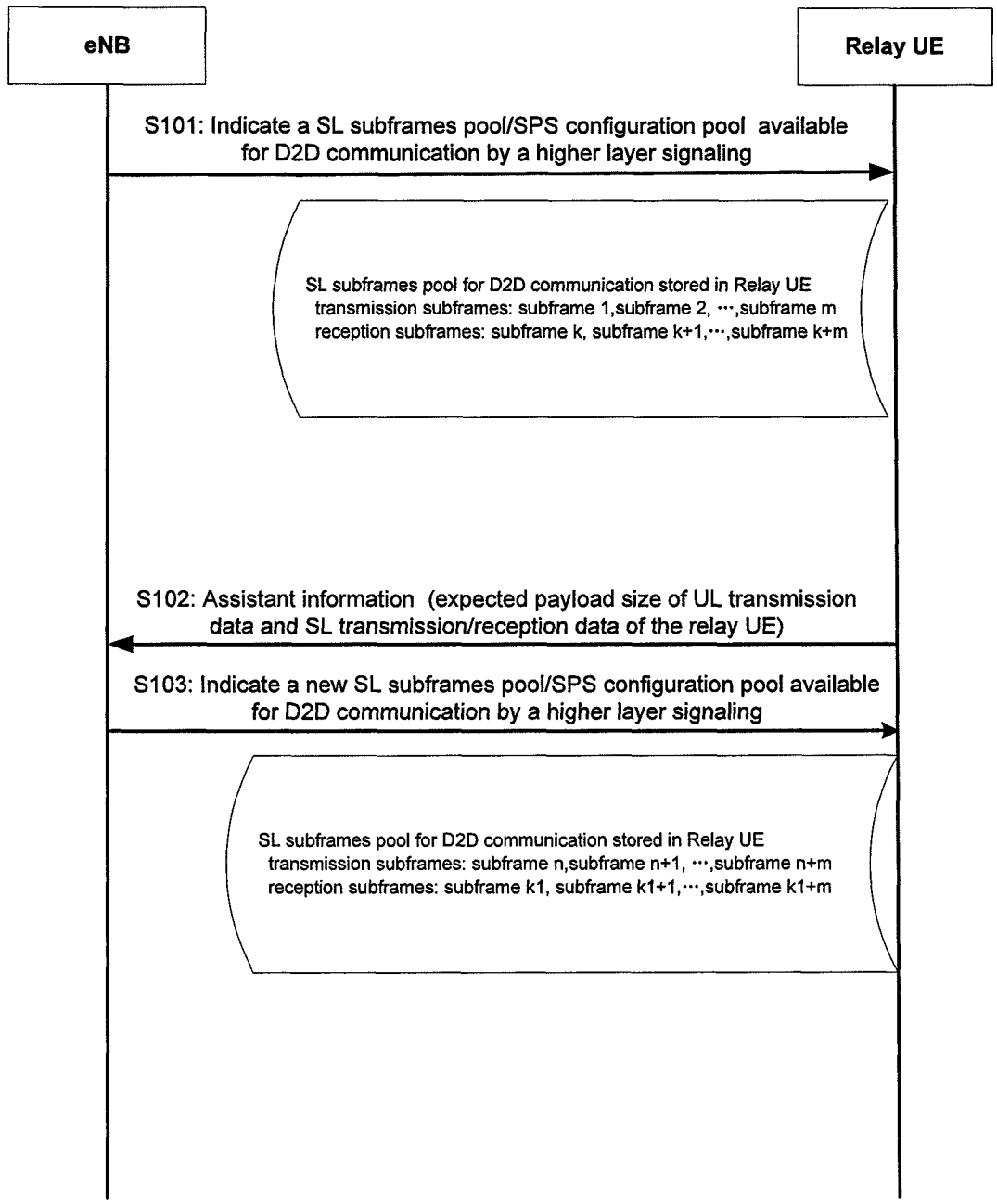
FIG. 10 is a call flow illustrating that a resources pool is updated according to assistant information from a relay UE according to another one embodiment.

FIG. 10 is a call flow illustrating that a resources pool is updated according to assistant information from a relay UE according to another one embodiment.

As shown in FIG. 10, eNB indicates a resources pool available for D2D communication by a higher layer signaling. Relay UE stores the received resources pool. That is, the resources pair for SL communication is selected by Relay UE.

In step S102, Relay UE transmits assistant information including one or more of a channel state, a ratio, a buffer status of the relay unit, a buffer status report of one or more remote units, a buffer state of UL transmission of the relay unit, a buffer state of SL transmission/reception of the relay unit, an expected payload size of UL transmission data and SL transmission/reception data of the relay unit, a traffic type, a traffic period, a traffic priority, and a traffic payload size. eNB adjusts the resources pool for SL communication according to the assistant information. For example, if the expected payload size of UL transmission data and SL transmission/reception data of Relay UE is increased, eNB also increases the resources pool for SL communication.

In step S103, eNB indicates the new resources pool available for D2D communication by a higher layer signaling. Relay UE stores the new resources pool.

SL subframes pool is used as an example of a resources pool in FIG. 10, but it should be understood that a SL SPS configuration pool can also be used as an example of a resources pool.

Figure 11:
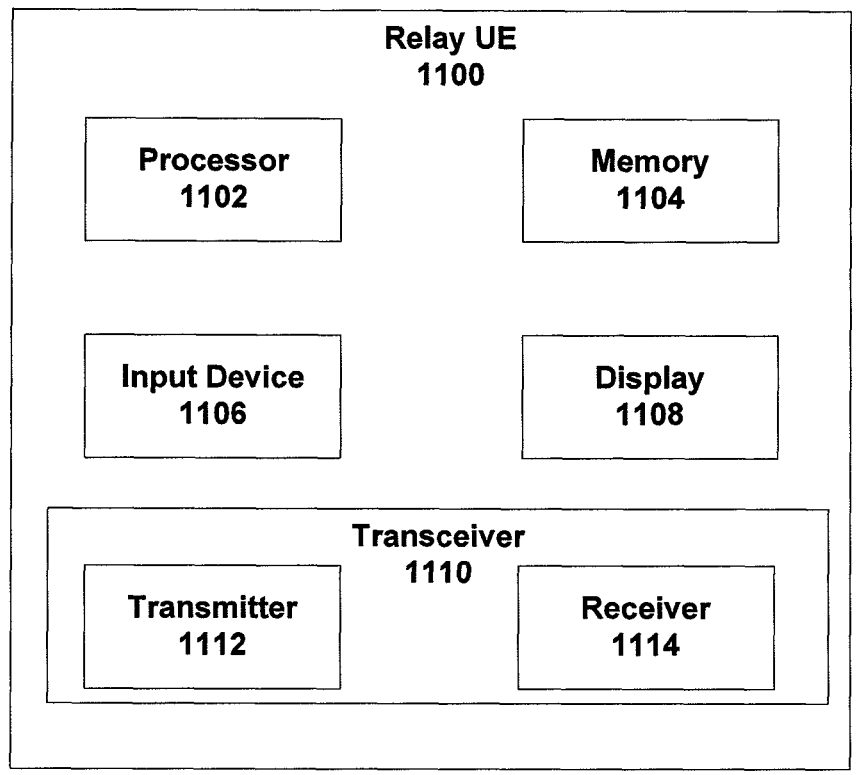
FIG. 11 is a schematic block diagram illustrating components of a relay UE according to one embodiment.

FIG. 11 is a schematic block diagram illustrating components of a relay UE according to one embodiment.

Relay UE1100 is an embodiment of Relay UE described from FIG. 4 to FIG. 10. Furthermore, Relay UE 1100 may include a processor 1102, a memory 1104, and a transceiver 1110. In some embodiments, Relay UE 1100 may include an input device 1106 and/or a display 1108. In certain embodiments, the input device 1106 and the display 1108 may be combined into a single device, such as a touch screen.

The processor 1102, in one embodiment, may include any known controller capable of executing computer-readable instructions and/or capable of performing logical operations. For example, the processor 1102 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1102 executes instructions stored in the memory 1104 to perform the methods and routines described herein. The processor 1102 is communicatively coupled to the memory 1104, the input device 1106, the display 1108, and the transceiver 1110.

In some embodiments, the processor 1102 controls the transceiver 1110 to transmit UL signals to Network Equipment 1200 and/or receive DL signals from Network Equipment 1200. For example, the processor 1102 may control the transceiver 1110 to transmit assistant information to Network Equipment 1100 indicating expected payload size of UL transmission data and SL transmission/reception data of Relay UE 1100. In another example, the processor 1102 may control the transceiver 1110 to receive a higher layer signaling such as RRC signaling including a resources pool or a download control signaling such as a DCI format over PDCCH including a resources pair, as described above. In certain embodiments, the processor 1102 may monitor DL signals received via the transceiver 1110 for specific messages. For example, the processor 1102 may monitor an indication for a selected resources pair by Relay UE 1100 corresponding to the assistant information transmitted from Relay UE 1100, as described above.

The memory 1104, in one embodiment, is a computer readable storage medium. In some embodiments, the memory 1104 includes volatile computer storage media. For example, the memory 1104 may include a RAM, including dynamic RAM ("DRAM"), synchronous dynamic RAM ("SDRAM"), and/or static RAM ("SRAM"). In some embodiments, the memory 1104 includes non-volatile computer storage media. For example, the memory 1104 may include a hard disk drive, a flash memory, or any other suitable non-volatile computer storage device. In some embodiments, the memory 1104 includes both volatile and non-volatile computer storage media. In some embodiments, the memory 1104 stores data relating to received resources pool from Network Equipment 1200. In some embodiments, the memory 1104 also stores program code and related data, such as an operating system or other controller algorithms operating on Relay UE 1100.

Relay UE 1100 may optionally include an input device 1106. The input device 1106, in one embodiment, may include any known computer input device including a touch panel, a button, a keyboard, a stylus, a microphone, or the like. In some embodiments, the input device 1106 may be integrated with the display 1108, for example, as a touch screen or similar touch-sensitive display. In some embodiments, the input device 1106 includes a touch screen such that text may be input using a virtual keyboard displayed on the touch screen and/or by handwriting on the touch screen. In some embodiments, the input device 1106 includes two or more different devices, such as a keyboard and a touch panel. In certain embodiments, the input device 1106 may include one or more sensors for monitoring an environment of Relay UE 1100.

Relay UE 1100 may optionally include a display 1108. The display 1108, in one embodiment, may include any known electronically controllable display or display device. The display 1108 may be designed to output visual, audible, and/or haptic signals. In some embodiments, the display 1108 includes an electronic display capable of outputting visual data to a user. For example, the display 1108 may include, but is not limited to, an LCD display, an LED display, an OLED display, a projector, or a similar display device capable of outputting images, text, or the like to a user. As another, non-limiting, example, the display 1108 may include a wearable display such as a smart watch, smart glasses, a heads-up display, or the like. Further, the display 1108 may be a component of a smart phone, a personal digital assistant, a television, a table computer, a notebook (laptop) computer, a personal computer, a vehicle dashboard, or the like.

In certain embodiments, the display 1108 may include one or more speakers for producing sound. For example, the display 1108 may produce an audible alert or notification (e.g., a beep or chime). In some embodiments, the display 1108 includes one or more haptic devices for producing vibrations, motion, or other haptic feedback. In some embodiments, all or portions of the display 1108 may be integrated with the input device 1106. For example, the input device 1106 and display 1108 may form a touch screen or similar touch-sensitive display. In other embodiments, the display 1108 may be located near the input device 1106.

The transceiver 1110, in one embodiment, is configured to communicate wirelessly with Network Equipment 1200. In certain embodiments, the transceiver 1110 comprises a transmitter 1112 and a receiver 1114. The transmitter 1112 is used to transmit UL communication signals to Network Equipment 1200 and the receiver 1114 is used to receive DL communication signals from Network Equipment 1200. For example, the transmitter 1112 may transmit assistant information indicating the selected resources pair by Relay UE 1100. As another example, the receiver 1114 may receive an indication for the selected resources pair by Relay UE 1100 from Network Equipment 1200. The indication for the selected resources pair by Relay UE 1100 may include a new resources pool, another resources pair which is different with the select resources pair by Relay UE 1100, or a confirmation for the selected resources pair by Relay UE 1100, as described above with reference to FIGS. 6A, 6B, 7A, 7B, 8A and 8B. Based on the indication, the transceiver 1110 may perform D2D communication with remote UEs.

The transmitter 1112 and the receiver 1114 may be any suitable types of transmitters and receivers. Although only one transmitter 1112 and one receiver 1114 are illustrated, the transceiver 1110 may have any suitable number of transmitters 1112 and receivers 1114. For example, in some embodiments, Relay UE 1100 includes a plurality of transmitter 1112 and receiver 1114 pairs for communicating on a plurality of wireless networks and/or radio frequency bands, each transmitter 1112 and receiver 1114 pair configured to communicate on a different wireless network and/or radio frequency band than the other transmitter 1112 and receiver 1114 pairs.

Figure 12:
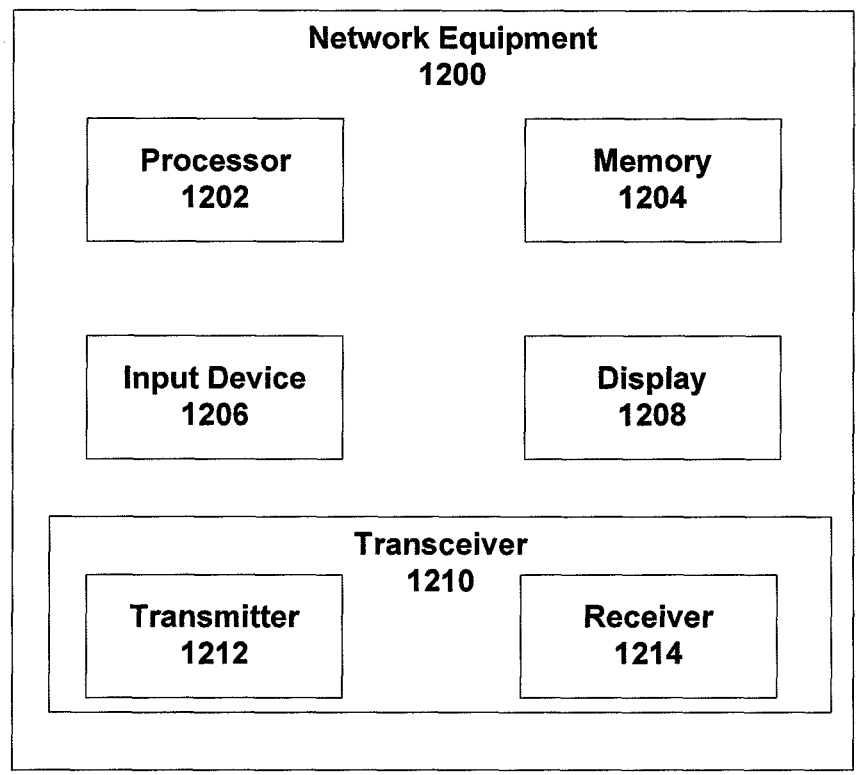
FIG. 12 is a schematic block diagram illustrating components of a network equipment according to one embodiment.

FIG. 12 is a schematic block diagram illustrating components of a network equipment according to one embodiment.

Network Equipment 1200 includes one embodiment of eNB described from FIG. 4 to FIG. 10. Furthermore, Network Equipment 1200 may include a processor 1202, a memory 1204, an input device 1206, a display 1208, and a transceiver 1210. As may be appreciated, the processor 1202, the memory 1204, the input device 1206, and the display 1208 may be substantially similar to the processor 1102, the memory 1104, the input device 1106, and the display 1108 of Relay UE 1100, respectively.

In some embodiments, the processor 1202 controls the transceiver 1210 to transmit DL signals to Relay UE 1100. The processor 1202 may also control the transceiver 1210 to receive UL signals from Relay UE 1100. For example, the processor 1202 may control the transceiver 1210 to receive assistant information indicating expected payload size of UL transmission data and SL transmission/reception data of Relay UE 1100. In another example, the processor 1202 may control the transceiver 1210 to transmit a higher layer signaling such as RRC signaling including a resources pool or a download control signaling such as a DCI format over PDCCH including a resources pair, as described above. In a further example, the processor 1202 may control the transceiver 1210 to receive assistant information including a selected resources pair by Relay UE 1100. In yet another example, the processor 1202 may control the transceiver 1210 to transmit an indication for the selected resources pair by Relay UE 1100.

The transceiver 1210, in one embodiment, is configured to communicate wirelessly with Relay UE 1100. In certain embodiments, the transceiver 1210 comprises a transmitter 1212 and a receiver 1214. The transmitter 1212 is used to transmit DL communication signals to Relay UE 1100 and the receiver 1214 is used to receive UL communication signals from Relay UE 1200. For example, the receivers 1214 may receive assistant information from Relay UE 1100. As another example, the transmitter 1212 may transmit an indication from Network Equipment 1200. The indication includes a new resources pool, another resources pair which is different with the select resources pair by Relay UE 1100, or a confirmation for the selected resources pair by Relay UE 1100, as described above with reference to FIGS. 6A, 6B, 7A, 7B, 8A and 8B.

The transceiver 1210 may communicate simultaneously with a plurality of Relay UE 1100. For example, the transmitter 1212 may transmit DL communication signals to Relay UE 1100. As another example, the receiver 1214 may simultaneously receive UL communication signals from Relay UE 1100. The transmitter 1212 and the receiver 1214 may be any suitable types of transmitters and receivers. Although only one transmitter 1212 and one receiver 1214 are illustrated, the transceiver 1210 may have any suitable number of transmitters 1212 and receivers 1214. For example, Network Equipment 1200 may serve multiple cells and/or cell sectors, wherein the transceiver 1210 includes a transmitter 1212 and a receiver 1214 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a base station, the apparatus further comprising:
   a transceiver that:
      transmits, to a relay unit, first resource information indicating a first resource pool for sidelink (SL) communication, wherein the first resource pool includes SL transmission resources and SL reception resources;
      receives, from the relay unit, at least two parameters selected from the group comprising: a channel state, a ratio, a buffer status of the relay unit, a buffer status report of one or more remote units, a first buffer state of uplink (UL) transmission of the relay unit, a second buffer state of SL transmission and reception of the relay unit, an expected payload size of UL transmission data and SL transmission and reception data of the relay unit, a traffic type, a traffic period, a traffic priority, a traffic payload size, or some combination thereof; and
      receives, from the relay unit, an indication of a first resources pair selected by the relay unit from the first resources pool, wherein the first resources pair includes SL transmission resources and SL reception resources, and the SL reception resources are corresponding to SL transmission resources; and
   a processor that determines a modification to the first resource pool, the modification to the first resource pool is determined based on the received indication and the at least two parameters selected from the group comprising: the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof;
   wherein the transceiver transmits second resource information indicating the modification to the first resource pool for SL transmission and reception to the relay unit.

2. A method of a base station, the method comprising:
   transmit, to a relay unit, first resource information indicating a first resource pool for sidelink (SL) communication, wherein the first resource pool includes SL transmission resources and SL reception resources;
   receiving, from the relay unit, at least two parameters selected from the group comprising: a channel state, a ratio, a buffer status of the relay unit, a buffer status report of one or more remote units, a first buffer state of uplink (UL) transmission of the relay unit, a second buffer state of sidelink transmission and reception of the relay unit, an expected payload size of UL transmission data and SL transmission and reception data of the relay unit, a traffic type, a traffic period, a traffic priority, a traffic payload size, or some combination thereof;
   receiving, from the relay unit, an indication of a first resources pair selected by the relay unit from the first resources pool, wherein the first resources pair includes SL transmission resources and SL reception resources, and the SL reception resources are corresponding to SL transmission resources;
   determining a modification to the first resource pool, wherein the modification to the first resource pool is determined based on the received indication and the at least two parameters selected from the group comprising: the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof; and transmitting second resource information indicating the modification to the first resource pool for SL transmission and reception from an apparatus to the relay unit.

3. The method according to claim 2, wherein the first resources pool is a SL subframes pool including SL transmission subframes and SL reception subframes, and the resources information is information about SL subframes.

4. The method according to claim 2, wherein the first resources pool is a semi-persistent scheduling (SPS) configurations pool including SL transmission SPS configurations and SL reception SPS configurations, and the resources information is information about SL SPS configurations.

5. The method according to claim 2, wherein the resources information is the first resources pool which is transmitted to the relay unit by a higher layer signaling.

6. The method according to claim 2, wherein the first resources pair is selected by the relay unit based on the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

7. The method according to claim 2, further comprising:
determining a second resources pool; and
transmitting the second resources pool to the relay unit by the higher layer signaling.

8. The method according to claim 7, further comprising:
not scheduling a UL transmission for the relay unit on one of more of SL transmission resources, SL reception resources in a resource pair for SL communication, and the resource pair for SL communication.

9. The method according to claim 2, further comprising:
determining a second resources pair for SL communication which is different with the first resources pair selected by the relay unit, the second resources pair includes SL transmission resources and SL reception resources, and the SL reception resources are corresponding to SL transmission resources; and
transmitting the second resources pair to the relay unit by a downlink control signaling.

10. The method according to claim 2, further comprising:
confirming the selection of the first resources pair for SL communication by the relay unit; and
transmitting an indication that the selection of the first resources pair for SL communication by the relay unit is confirmed.

11. The method according to claim 2, further comprising:
pre-configuring a priority flag which indicates a priority between UL transmission and SL transmission and reception, wherein if the priority flag indicates that the priority of UL transmission is higher than that of SL transmission and reception for the relay unit, the relay unit waits for a confirmation from the apparatus in response to the selection of the first resources pair for SL communication by the relay unit, otherwise, the relay unit performs SL communication using the first resources pair; and
transmitting the priority flag to the relay unit by a higher layer signaling or a downlink control signaling.

12. The method according to claim 2, wherein the resources information is a second resources pair selected by the apparatus and transmitted to the relay unit by a downlink control signaling, and the second resources pair includes SL transmission resources and SL reception resources, and the SL reception resources are corresponding to SL transmission resources.

13. The method according to claim 12, wherein the second resources pair is selected by the apparatus based on the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

14. An apparatus comprising a relay unit, the apparatus further comprising:
a transceiver that:
receives, from a base station, first resource information indicating a first resource pool for sidelink (SL) communication, wherein the first resource pool includes SL transmission resources and SL reception resources;
transmits, to the base station, at least two parameters selected from the group comprising: a channel state, a ratio, a buffer status of the relay unit, a buffer status report of one or more remote units, a first buffer state of uplink (UL) transmission of the relay unit, a second buffer state of sidelink (SL) transmission and reception of the relay unit, an expected payload size of UL transmission data and SL transmission and reception data of the relay unit, a traffic type, a traffic period, a traffic priority, a traffic payload size, or some combination thereof;
transmits, to the base station, an indication of a first resources pair selected by the relay unit from the first resources pool, wherein the first resources pair includes SL transmission resources and SL reception resources, and the SL reception resources are corresponding to SL transmission resources; and
receives second resources information indicating a modification to the first resource pool from the base station, wherein the modification to the first resource pool is determined based on the transmitted indication and the at least two parameters selected from the group comprising: the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

15. A method of a relay unit, the method comprising:
receiving, from a base station, first resource information indicating a first resource pool for sidelink (SL) communication, wherein the first resource pool includes SL transmission resources and SL reception resources;
transmitting, to the base station, at least two parameters selected from the group comprising: a channel state, a ratio, a buffer status of the relay unit, a buffer status report of one or more remote units, a first buffer state of uplink (UL) transmission of the relay unit, a second buffer state of sidelink (SL) transmission and reception of the relay unit, an expected payload size of UL transmission data and SL transmission and reception data of the relay unit, a traffic type, a traffic period, a traffic priority, a traffic payload size, or some combination thereof;

transmitting, to the base station, an indication of a first resources pair selected by the relay unit from the first resources pool, wherein the first resources pair includes SL transmission resources and SL reception resources, and the SL reception resources are corresponding to SL transmission resources; and receiving second resources information indicating a modification to the first resource pool from the base station, wherein the modification to the first resource pool is determined based on the transmitted indication and the at least two parameters selected from the group comprising: the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

16. The method according to claim 15, wherein the first resources pool is a SL subframes pool including SL transmission subframes and SL reception subframes, and the resources information is information about SL subframes.

17. The method according to claim 15, wherein the first resources pool is a semi-persistent scheduling (SPS) configurations pool including SL transmission SPS configurations and SL reception SPS configurations, and the resources information is information about SL SPS configurations.

18. The method according to claim 15, wherein the resources information is the resources pool which is transmitted from the network equipment by a higher layer signaling.

19. The method according to claim 18, further comprising:
selecting the first resources pair from the first resources pool.

20. The method according to claim 19, wherein the first resources pair is selected by the apparatus based on the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

21. The method according to claim 19, further comprising receiving a second resources pool from the network equipment by the higher layer signaling.

22. The method according to claim 21, further comprising, if there is a UL scheduling in the SL reception resources of the resource pair for SL communication, prioritizing SL reception over UL transmission in the SL reception resources of the resource pair for SL communication.

23. The method according to claim 19, further comprising receiving a second resources pair for SL communication, which is different with the first resources pair selected by the apparatus, from the network equipment by a downlink control signaling, the second resources pair includes SL transmission resources and SL reception resources, and the SL reception resources are corresponding to SL transmission resources.

24. The method according to claim 19, further comprising receiving an indication from the network equipment that the selection of the first resources pair for SL communication by the apparatus is confirmed.

25. The method according to claim 19, further comprising receiving a priority flag from the network equipment by a higher layer signaling or a downlink control signaling, which indicates a priority between UL transmission and SL transmission and reception, wherein if the priority flag indicates that the priority of UL transmission is higher than that of SL transmission and reception for a relay unit, the relay unit waits for a confirmation from the network equipment in response to the selection of the first resources pair for SL communication by the apparatus, otherwise, the apparatus performs SL communication using the first resources pair.

26. The method according to claim 15, wherein the resources information is a second resources pair selected by the apparatus and transmitted from the network equipment by a downlink control signaling, and the second resources pair includes SL transmission resources and SL reception resources, and the SL reception resources are corresponding to the SL transmission resources.

27. The method according to claim 26, wherein the second resources pair is selected by the network equipment based on the channel state, the ratio, the buffer status of the relay unit, the buffer status report of one or more remote units, the first buffer state of UL transmission of the relay unit, the second buffer state of SL transmission and reception of the relay unit, the expected payload size of UL transmission data and SL transmission and reception data of the relay unit, the traffic type, the traffic period, the traffic priority, the traffic payload size, or some combination thereof.

* * * * *